United States Patent
Park et al.

(10) Patent No.: US 9,599,922 B2
(45) Date of Patent: Mar. 21, 2017

(54) LIGHT SCANNING APPARATUS AND IMAGE FORMING APPARATUS EMPLOYING THE SAME

(71) Applicant: SAMSUNG ELECTRONICS, CO., LTD., Suwon (KR)

(72) Inventors: Chul-hyun Park, Yongin (KR); In-sung Lee, Suwon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/845,928

(22) Filed: Sep. 4, 2015

(65) Prior Publication Data

US 2016/0070196 A1    Mar. 10, 2016

(30) Foreign Application Priority Data

Sep. 4, 2014    (KR) .......................... 10-2014-0117826

(51) Int. Cl.
*G03G 15/22*    (2006.01)
*G03G 15/04*    (2006.01)
(Continued)

(52) U.S. Cl.
CPC ....... *G03G 15/04036* (2013.01); *G02B 26/12* (2013.01); *G02B 27/0006* (2013.01);
(Continued)

(58) Field of Classification Search
CPC .................................................... G03G 15/22
(Continued)

(56) References Cited

U.S. PATENT DOCUMENTS

| | | | |
|---|---|---|---|
| 5,803,622 A * | 9/1998 | Mama .................... | B41J 2/471 347/257 |
| 2006/0018670 A1* | 1/2006 | Yoon ...................... | B41J 2/465 399/4 |

(Continued)

FOREIGN PATENT DOCUMENTS

| | | | |
|---|---|---|---|
| EP | 2 189 834 A1 | 5/2010 | |
| JP | 5-72495 | 3/1993 | |
| JP | 1993-072495 | * 3/1993 | ............... B41J 2/44 |

OTHER PUBLICATIONS

Extended European Search Report issued Jan. 21, 2016 in corresponding European Patent Application No. 15183836.4.*

(Continued)

*Primary Examiner* — Clayton E Laballe
*Assistant Examiner* — Kevin Butler
(74) *Attorney, Agent, or Firm* — Staas & Halsey LLP

(57) ABSTRACT

Provided are a light scanning apparatus and an image forming apparatus including the same. The light scanning apparatus includes a housing, which includes a space therein; a light source module, which is installed at the housing and emits a light beam; a light deflector, which is installed on the bottom surface of the housing and deflects the light beam emitted by the light source module; an image forming optical system, which is installed in the space inside the housing and forms an image of the light beam deflected by the light deflector on a surface to be scanned; a flow restricting unit, which is arranged in the space inside the housing and restricts air flows formed as the light deflector is driven; and a cover, which covers the housing.

36 Claims, 11 Drawing Sheets

(51) Int. Cl.
  *G02B 26/12* (2006.01)
  *G02B 27/00* (2006.01)
  G03G 15/32 (2006.01)
  H04N 1/00 (2006.01)
  B41J 2/45 (2006.01)

(52) U.S. Cl.
  CPC .......... *B41J 2/45* (2013.01); *G03G 15/04018* (2013.01); *G03G 15/221* (2013.01); *G03G 15/326* (2013.01); *H04N 1/00254* (2013.01)

(58) Field of Classification Search
  USPC .......................................................... 399/4
  See application file for complete search history.

(56) References Cited

U.S. PATENT DOCUMENTS

| | | | |
|---|---|---|---|
| 2007/0058235 A1* | 3/2007 | Nagase | G02B 26/121 |
| | | | 359/216.1 |
| 2010/0091083 A1* | 4/2010 | Itami | B41J 2/471 |
| | | | 347/261 |
| 2011/0074908 A1* | 3/2011 | Yoo | B41J 2/473 |
| | | | 347/224 |
| 2011/0182621 A1* | 7/2011 | Hirakawa | G03G 15/0409 |
| | | | 399/151 |
| 2016/0070196 A1* | 3/2016 | Park | G03G 15/04036 |
| | | | 347/118 |

OTHER PUBLICATIONS

European Patent Office, European Search Report, EP15183836, Jan. 12, 2016, 6 pgs.*

* cited by examiner

LIGHT SCANNING APPARATUS AND IMAGE FORMING APPARATUS EMPLOYING THE SAME

CROSS-REFERENCE TO RELATED APPLICATION

This application claims the benefit of Korean Patent Application No. 10-2014-0117826, filed on Sep. 4, 2014, in the Korean Intellectual Property Office, the disclosure of which is incorporated herein in its entirety by reference.

BACKGROUND

1. Field

The present disclosure relates to a light scanning apparatus and an image forming apparatus including the same, and more particularly, to a light scanning apparatus that deflects and scans a light beam and an image forming apparatus that performs an electrophotography process for recording image information on a surface to be scanned by using the same.

2. Description of the Related Art

An electrophotography type image forming apparatus, such as a laser printer, a digital copier, or a multi-function printer (MFP), forms an electrostatic latent image by scanning a light beam onto a photosensitive body by using a light scanning apparatus. The formed electrostatic latent image is developed to a developed image by using a developing agent, such as a toner, and the developed image is transferred to a printing medium.

A light scanning apparatus reflects and deflects a light beam (light flux) by using a light deflector, such as a polygonal mirror rotating at a high speed, and scans the light beam onto a surface to be scanned by using an image forming optical system having fθ characteristics. Printing speed of an image forming apparatus is proportional to scanning speed of a light deflector of a light scanning apparatus (e.g., rotating speed of a polygonal mirror). Here, it is necessary to resolve rotating noises of a light deflector which increase as the printing speed of an image forming apparatus increases.

Furthermore, since contamination of light deflector by foreign substances from outside is fatal to embody high speed and a long life expectancy, it is necessary to prevent the contamination.

In a light scanning apparatus in the related art, other than a housing of the light scanning apparatus, a light deflector cover is put on the light deflector to prevent rotating noises or contamination of the light deflector. Since a light deflector is arranged to deflect and scan light beam, windows through which light beam may pass are formed in the light deflector cover. In case of using a separate light deflector cover as described above, the overall manufacturing process becomes complicated due to an increased number of parts and material costs of a light scanning apparatus increases.

SUMMARY

Provided are a light scanning apparatus with an enhanced structure for reducing noises generated by high-speed revolution of a light deflector without an additional component and an image forming apparatus including the same.

Provided are a light scanning apparatus with an enhanced structure for preventing contamination of a light deflector without an additional component and an image forming apparatus including the same Additional aspects will be set forth in part in the description which follows and, in part, will be apparent from the description, or may be learned by practice of the presented exemplary embodiments.

According to an aspect of an exemplary embodiment, a light scanning apparatus includes a housing, which includes a space therein; a light source module, which is installed at the housing and emits a light beam; a light deflector, which is installed on the bottom surface of the housing and deflects the light beam emitted by the light source module; an image forming optical system, which is installed in the space inside the housing and forms an image of the light beam deflected by the light deflector on a surface to be scanned; a flow restricting unit, which is arranged in the space inside the housing and restricts air flows occurred as the light deflector is driven; and a cover, which covers the housing.

The light source module is installed at a side of the housing, and the flow restricting unit is located between the light source module and the light deflector and blocks air flows toward the light source module from among air flows formed as the light deflector is driven.

The flow blocking unit includes at least one or more flow blocking partitioning walls.

The at least one or more flow blocking partitioning walls includes a first flow blocking partitioning wall arranged at the housing and a second flow blocking partitioning wall arranged at the cover, and the first flow blocking partitioning wall and the second flow blocking partitioning wall are alternately arranged.

The first flow blocking partitioning wall extends upward from the housing and is integrated thereto, and the second flow blocking partitioning wall extends downward from the cover and is integrated thereto.

Portions of the at least one or more flow blocking partitioning walls intersecting with a light path of a light beam that is emitted by the light source module and travels toward the light deflector are opened or replaced with transparent members.

The light scanning apparatus further includes a synchronization detecting unit including a synchronization detecting sensor for detecting a synchronization signal of a light beam scanned by the light deflector, wherein the synchronization detecting sensor is installed at a side of the housing having installed thereon the light source module, and the flow restricting unit extends to the space between the synchronization detecting sensor and the light deflector.

The light scanning apparatus further includes an incidence optical system including at least one lens arranged between the light source module and the light deflector, wherein a portion of the flow blocking unit extends to a fixing unit for fixing the at least one lens of the incidence optical system.

The flow restricting unit further includes a dust trapping unit for suppressing contamination due to dusts that flow as the light deflector is driven.

The dust trapping unit includes a flow guide for guiding air flows formed as the light deflector is driven.

The dust trapping unit includes a dust storage unit for trapping dusts.

The flow restricting unit includes a dust trapping unit for suppressing contamination due to dusts that flow as the light deflector is driven.

The dust trapping unit includes a flow guide for guiding air flows formed as the light deflector is driven.

At least a portion of the flow guide is located between the light deflector and the image forming optical system.

The flow guide includes a curved guiding plate that surrounds at least a portion of the flow guide.

The flow guide is a straight guiding plate, a curved guiding plate, or a combination thereof.

The flow guide is arranged at at least one of the cover and the housing.

The flow guide is integrated to at least one of the cover and the housing.

The dust trapping unit further includes a dust storage unit for trapping dusts.

An inlet of the dust storage unit is arranged nearby an end of the flow guide.

The dust trapping unit further includes a dust storage unit for trapping dusts.

The dust storage unit is arranged at a side of the space in which the image forming optical system is installed.

The light deflector includes a rotating polygonal mirror, and the dust storage unit is located at the downstream side of a rotating direction of the polygonal mirror between the polygonal mirror and the image forming optical system.

As a partitioning wall protruding from the bottom surface of the housing and a partitioning wall protruding from the bottom surface of the cover are interlocked with each other, the dust storage unit is sealed except the inlet.

One or a plurality of inner partitioning walls are arranged inside the dust storage unit.

The plurality of inner partitioning walls are arranged in parallel to one of partitioning walls surrounding the dust storage unit.

The plurality of inner partitioning wall are formed on two partitioning walls facing each other from among the partitioning wall surrounding the dust storage unit and are alternately arranged.

Height of the bottom surface of the dust storage unit is different from height of the bottom surface of the housing, and a sloped portion for compensating the height difference is arranged at the inlet of the dust storage unit.

The light source module includes first and second light sources that emit first and second light beams, the first and second light beams emitted by the light source module are incident to different reflective surfaces of the light deflector and are deflected and scanned in different directions, and the image forming optical system forms images of the light beams scanned in different directions on the surface to be scanned.

The first and second light sources are located on a same sidewall of the housing, and the flow restricting unit is located between the first and second light sources and the light deflector and blocks air flows formed as the light deflector is driven.

The first and second light sources are located on sidewalls of the housing facing each other, and the flow restricting unit is located between the first light sources and the light deflector and/or between the second light source and the light deflector and blocks air flows formed as the light deflector is driven.

The flow restricting unit further includes a dust trapping unit for suppressing contamination due to dusts that flow as the light deflector is driven.

The dust trapping unit includes a flow guide for guiding air flows formed as the light deflector is driven, and at least a portion of the flow guide is located between the light deflector 140 and the first image forming optical system and/or between the light deflector and the second image forming optical system.

The dust trapping unit includes a dust storage unit for trapping dusts, and the dust storage unit is arranged at a side of the space in which the first image forming optical system is installed and/or at a side of the space in which the second image forming optical system is installed.

According to an aspect of another exemplary embodiment, an image forming apparatus includes an image carrier; a light scanning apparatus, which forms an electrostatic latent image by scanning a light beam onto a surface to be scanned of the image carrier, wherein the light scanning apparatus comprises: a housing, which includes a space therein; a light source module, which is installed at the housing and emits a light beam; a light deflector, which is installed on the bottom surface of the housing and deflects the light beam emitted by the light source module; an image forming optical system, which is installed in the space inside the housing and forms an image of the light beam deflected by the light deflector on the surface to be scanned of the image carrier; a flow restricting unit, which is arranged in the space inside the housing and restricts air flows occurred as the light deflector is driven; and a cover, which covers the housing; and a developing unit, which develops the electrostatic latent image formed on the image carrier by supplying a toner thereto.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
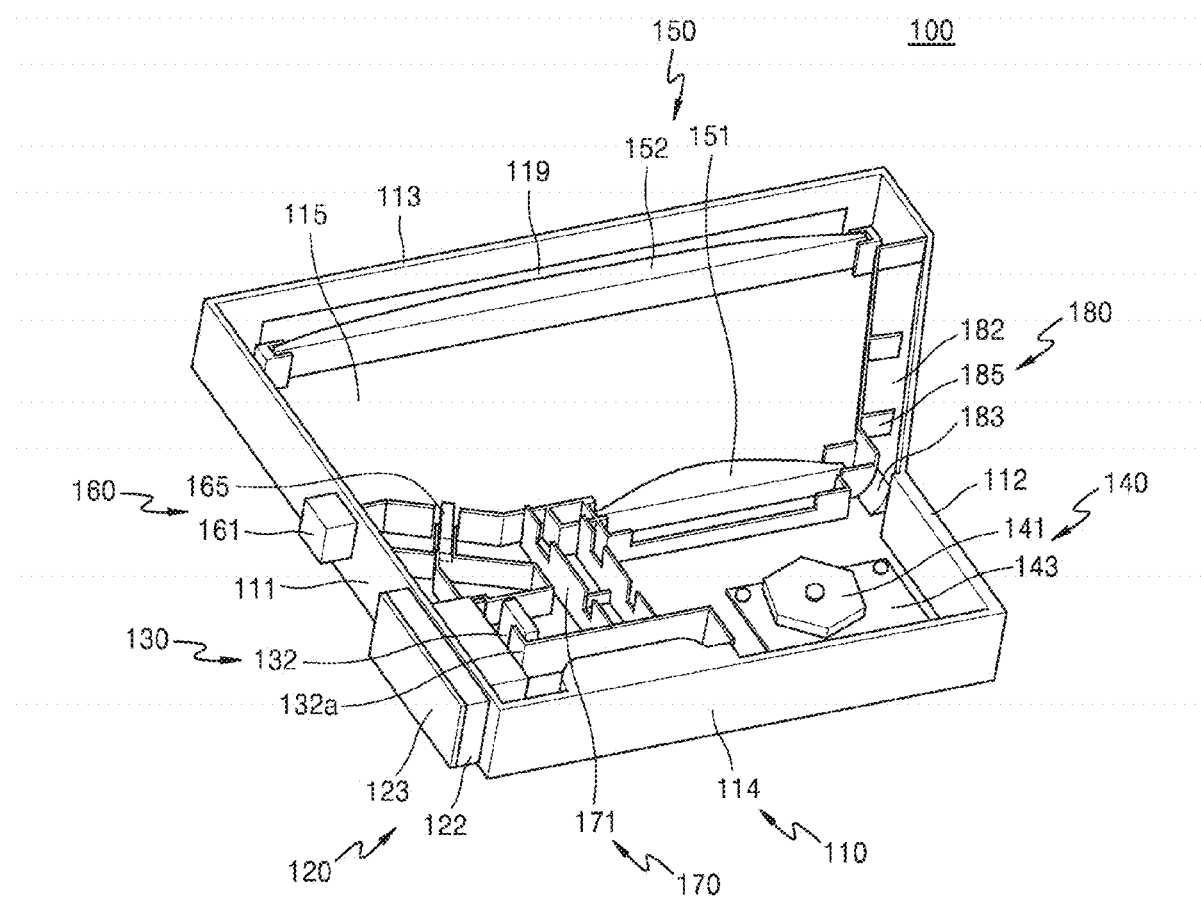
FIG. 1 is a schematic exploded perspective view of a light scanning apparatus according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items.

Terms used in the present specification will be briefly described below, and then the detailed descriptions of the inventive concept will be given.

Although the terms used in the inventive concept are selected from generally known and used terms, some of the terms mentioned in the description of the inventive concept have been selected by the applicant at his or her discretion, the detailed meanings of which are described in relevant parts of the description herein. Furthermore, it is required that the inventive concept is understood, not simply by the actual terms used but by the meaning of each term lying within.

In addition, unless explicitly described to the contrary, the word "comprise" and variations such as "comprises" or "comprising" will be understood to imply the inclusion of stated elements but not the exclusion of any other elements.

Various embodiments of the present invention will now be described more fully with reference to the accompanying drawings, in which exemplary embodiments of the invention are shown. In the description of the various embodiments, certain detailed explanations of related art are omitted when it is deemed that they may unnecessarily obscure the essence of the invention.

Figure 2:
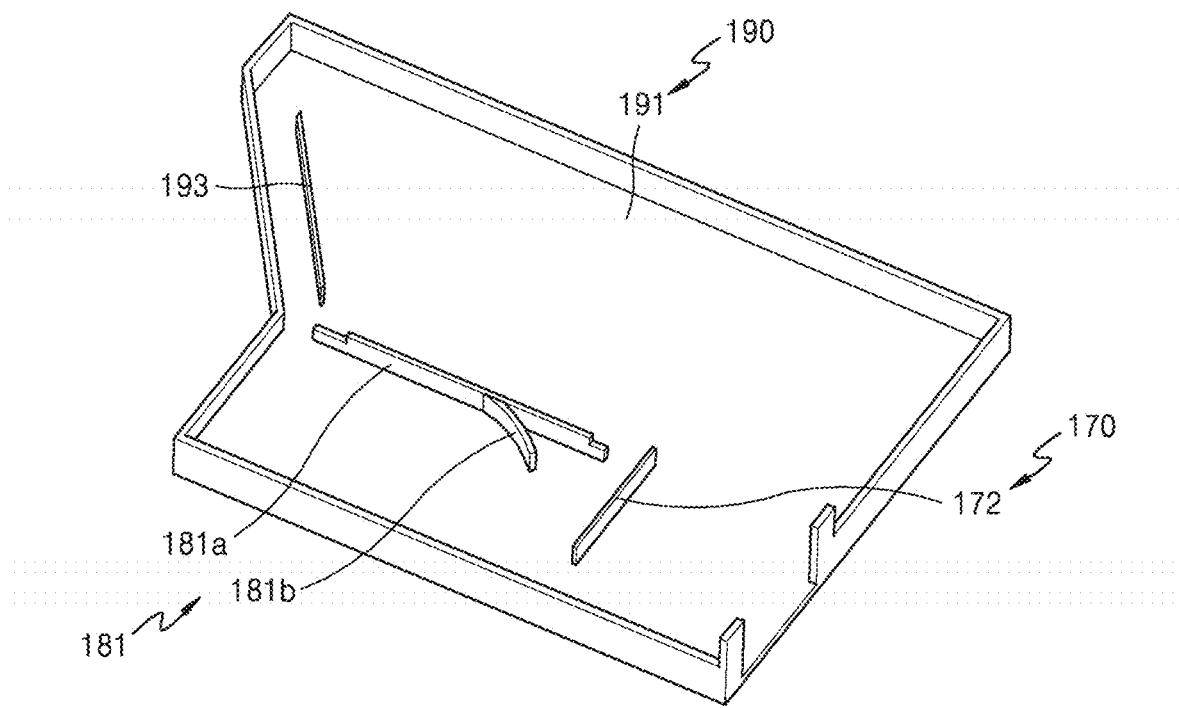
FIG. 2 is a diagram showing a bottom surface of a cover of the light scanning apparatus.

FIG. 1 is a schematic exploded perspective view of a light scanning apparatus 100 according to an exemplary embodiment, and FIG. 2 is a diagram showing a bottom surface 191 of a cover 190 of the light scanning apparatus 100.

Referring to FIGS. 1 and 2, the light scanning apparatus 100 according to the present embodiment includes a housing 110 and the cover 190 that covers the housing 110.

The housing 110 may include first to fourth sidewalls 111, 112, 113, and 114 and a bottom surface 115 surrounded by the first to fourth sidewalls 111, 112, 113, and 114. Various optical parts (e.g., an incidence optical system 130, a light deflector 140, an image forming optical system 150, and a synchronization detecting unit 160) of the light scanning apparatus 100 are installed on the bottom surface 115 of the housing 110. Furthermore, a light source module 120 is mounted on a first sidewall 111 of the housing 110. Furthermore, a flow blocking unit 170 or a dust trapping unit 180 is arranged in the space inside the housing 110, as described below.

The cover 190 may seal the space inside the housing 110 from outside by covering the top of the housing 110, thereby preventing optical parts from being contaminated by outside contaminants. The housing 110 and the cover 190 may be molded structures formed of a plastic resin, for example. As described below, a portion of the flow blocking unit 170 or the dust trapping unit 180 may be arranged on a bottom surface 191 of the cover 190. The housing 110 and the cover 190 may have a protrusion-recess structure to be interlocked with each other or an elastic member may be arranged between the housing 110 and the cover 190 for improved sealing.

The light source module 120 may include a light source holder 122 for fixing a light source (not shown) and a circuit board 123 having mounted thereon the light source holder 122. A laser diode may be employed as a light source. The light source emits a light beam (L of FIG. 3) that is modulated according to an image signal corresponding to image information. A light source mount (not shown) is arranged on the outer surface of the first sidewall 111 of the housing 110, and the light source module 120 is mounted at the light source mount outside the first sidewall 111. According to another exemplary embodiment, the light source module 120 may be attached to the inner surface of the first sidewall 111 of the housing 110.

The light deflector 140 is installed on the bottom surface 115 of the space inside the housing 110. The light deflector 140 may include a polygonal mirror 141 having a plurality of reflective surfaces, a driving motor (not shown) for rotating the polygonal mirror 141, and a circuit board 143 having formed thereon a driving circuit for driving the driving motor, for example. The polygonal mirror 141 and the driving motor of the light deflector 140 are mounted on the circuit board 143 and may be installed on the bottom surface 115 of the housing 110. In another example, the light deflector 140 may be an oscillation mirror manufactured via a microelectromechanical systems (MEMS). A light beam L emitted by the light source module 120 is deflected by the light deflector 140 and scanned.

An incidence optical system 130 may be arranged on a light path between the light source module 120 and the light deflector 140. The incidence optical system 130 may include a collimator lens (not shown) and a cylindrical lens 132. The collimator lens is a condensing lens for converting a light beam L emitted by a light source to a collimating light or a convergent light. The collimator lens may be mounted at an emission end of the light source holder 122. According to another exemplary embodiment, the collimator lens may be adjacent to the emission end of the light source module 120 and installed on the bottom surface 115 of the housing 110 via a separate lens holder. The cylindrical lens 132 is an anamorphic lens for forming a nearly linear image of the light beam L on a reflective surface of the light deflector 140 by condensing the light beam L in a sub-scanning direction (in other words, a direction parallel to the rotating axis of the light deflector 140). The cylindrical lens 132 may be arranged between the collimator lens and the light deflector 140. A light-flux limiting element (not shown) for shaping a cross section of a light flux (that is, a diameter and a shape) may be further arranged on the light path between the light source module 120 and the light deflector 140.

The image forming optical system 150 may be arranged on a light path of a light beam reflected by the light deflector 140.

The image forming optical system 150 forms an image of a light beam L, which is deflected and scanned as the polygonal mirror 141 of the light deflector 140 rotates, on a surface to be scanned onto a surface to be scanned (e.g., the outer circumferential surface of a photosensitive drum (320 of FIG. 14) of an image forming apparatus (300 of FIG. 14) described below). The image forming optical system 150 may be located between the light deflector 140 and the third sidewall 113 of the housing 110. A light beam L passed through the image forming optical system 150 travels toward the surface to be scanned via a cover glass 119 arranged nearby the third sidewall 113.

The image forming optical system 150 may include first and second scanning lenses 151 and 152. Incidence surfaces and emission surfaces of the first and second scanning lenses 151 and 152 may be formed to extend in a lengthwise direction to cover regions scanned by the light beam L scanned by the light deflector 140. The first and second scanning lenses 151 and 152 may have fθ characteristics for correcting a light beam, which is deflected and scanned, to be scanned to the emission surface at a constant velocity. For example, the polygonal mirror 141 may be designed to have a very small or substantially zero refraction index in the sub-scanning direction, whereas the second scanning lens 152 may be designed to substantially provide a refraction index in the sub-scanning direction.

A number of scanning lenses constituting the image forming optical system 150 may vary according to optical designs and does not limit the present embodiment. For example, the image forming optical system 150 may include one scanning lens.

The synchronization detecting unit 160 for detecting a synchronization signal of a light beam deflected and scanned by the light deflector 140 may be arranged. The synchronization detecting unit 160 may include a synchronization detecting sensor 161 for receiving a portion of a light beam deflected and scanned as the polygonal mirror 141 of the light deflector 140 rotates and a synchronization detecting lens 165 for condensing a light beam to the synchronization detecting sensor 161. Since a number of scan lines identical to a number of reflective surfaces of the polygonal mirror 141 may be formed on a surface to be scanned while the polygonal mirror 141 of the light deflector 140 rotates during one time revolution, the synchronization detecting unit 160 may be located to be able to detect the starting end of each scan line. In FIG. 1, when the polygonal mirror 141 rotates in the clockwise direction, the starting ends of the respective scan lines are at the side adjacent to the light source module 120. Therefore, a sensor mount (not shown) may be arranged on the outer surface of the first sidewall 111, and the synchronization detecting sensor 161 may be attached to the sensor mount of the first sidewall 111. According to another exemplary embodiment, the synchronization detecting sensor 161 may be attached to the inner surface of the first sidewall 111. Although the present embodiment is described in relation to a case in which both the light source module 120 and the synchronization detecting sensor 161 are arranged on the first sidewall 111 of the housing 110, the inventive concept is not limited thereto. According to another exemplary embodiment, the polygonal mirror 141 may rotate in the counterclockwise direction or a light path may be changed by using a reflective mirror, and thus the synchronization detecting sensor 161 may be installed on the second sidewall 112 of the housing 110 facing the first sidewall 111.

The flow blocking unit 170 is arranged in the space inside the housing 110. The flow blocking unit 170 is an example of flow restriction units for restricting an air flow formed as the light deflector 140 is driven.

Figure 3:
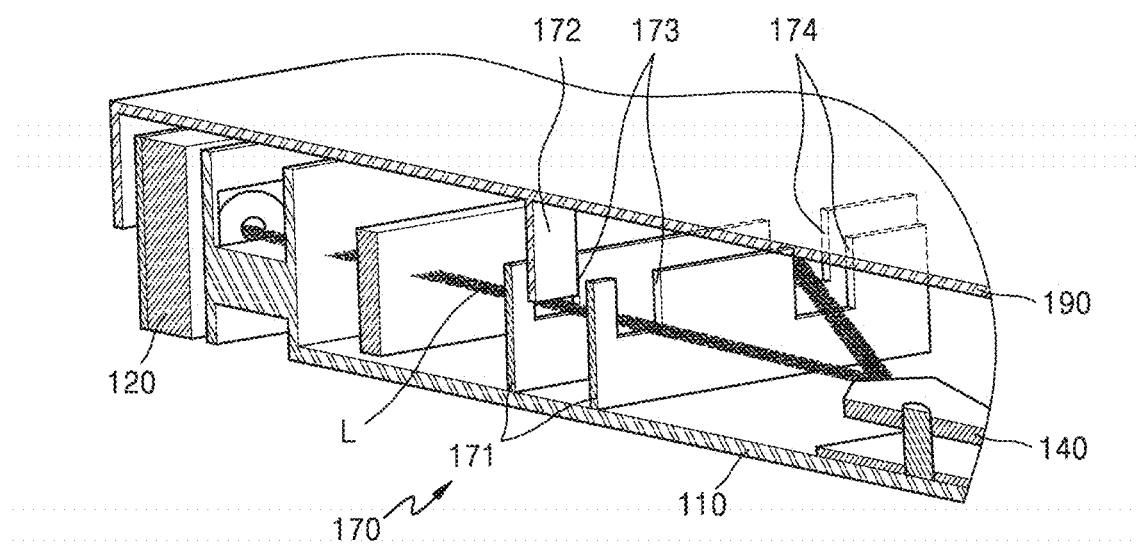
FIG. 3 is a schematic sectional view of the flow blocking unit of the light scanning apparatus according to the present embodiment.
Figure 4:
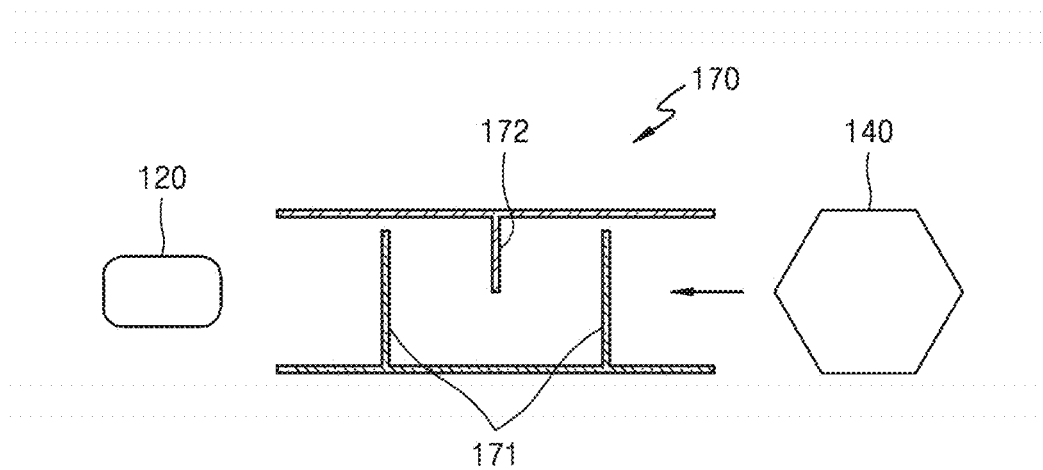
FIG. 4 is a schematic diagram showing the flow blocking unit of FIG. 3.

FIG. 3 is a schematic sectional view of the flow blocking unit 170 of the light scanning apparatus 100 according to the present embodiment, and FIG. 4 is a schematic diagram showing the flow blocking unit 170 of FIG. 3. Referring to FIGS. 1 through 4, the flow blocking unit 170 may be located between the light source module 120 and the light deflector 140. The flow blocking unit 170 may include two first flow blocking partitioning walls 171 arranged at the housing 110 and a second flow blocking partitioning wall 172 arranged at the cover 190. The two first flow blocking partitioning walls 171 and the second flow blocking partitioning wall 172 are alternately arranged in parallel. In other words, the two first flow blocking partitioning walls 171 are apart from each other to face each other, and the second flow blocking partitioning wall 172 may be located between the two first flow blocking partitioning walls 171. The first flow blocking partitioning walls 171 and the second flow blocking partitioning wall 172 may be interlocked with each other while being apart from each other or closely contacting each other. When viewed from above, the first flow blocking partitioning walls 171 and the second flow blocking partitioning wall 172 may be formed to have shapes of straight lines or bent lines. According to another exemplary embodiment, the first and second flow blocking partitioning walls 171 and 172 may be formed to have shapes of curves greater than the outer circumference of the polygonal mirror 141 of the light deflector 140.

As described above, since the housing 110 and the cover 190 may be molded structures formed of a plastic resin, the first flow blocking partitioning wall 171 may protrude upward from the bottom surface 115 of the housing 110 as a structure integrated thereto, whereas the second flow blocking partitioning wall 172 may protrude downward from the bottom surface 191 of the cover 190 as a structure integrated thereto. Such a structure in which the first and second flow blocking partitioning walls 171 and 172 are integrated with the housing 110 and the cover 190 is simple in terms of a mechanical mold structure and may be easily formed without significant modifications of configurations of the housing 110 and the cover 190 in the related art. According to another exemplary embodiment, the first and second flow blocking partitioning walls 171 and 172 may be fabricated separately and attached to the housing 110 and the cover 190

Since the first and second flow blocking partitioning walls 171 and 172 are located on a path of a light beam L that is emitted by the light source module 120 and travels toward the light deflector 140, portions of the first and second flow blocking partitioning walls 171 and 172 through which the light beam L travels are opened. For example, as shown in FIGS. 3 and 4, a light path 173 may be formed by removing a portion of the first flow blocking partitioning wall 171 through which the light beam L travels, and the bottom end of the second flow blocking partitioning wall 172 may be located higher than a height at which the light beam L travels. According to another exemplary embodiment, the light path 173 of the first flow blocking partitioning wall 171 through which the light beam L travels may be replaced with a transparent member.

The first and second flow blocking partitioning walls 171 and 172 may not only suppresses noises as described below, but also reinforces structural strength of the housing 110.

Referring back to FIG. 1, as described above, since the light source module 120 and the synchronization detecting sensor 161 are arranged on the first sidewall 111 of the housing 110 in the present embodiment, the first and second flow blocking partitioning walls 171 and 172 may extend to the space between the synchronization detecting sensor 161 and the light deflector 140. In this case, portions of the first and second flow blocking partitioning walls 171 and 172 through which the light beam L for detecting synchronization travels are opened, such that the light beam L for detecting synchronization that is reflected by the light deflector 140 and travels toward the synchronization detecting unit 160 may pass through the first and second flow blocking partitioning walls 171 and 172. Furthermore, the first flow blocking partitioning wall 171 arranged at the housing 110 may extend to a fixing member 132*a* that fixes an optical member (e.g., a cylindrical lens 132) of the incidence optical system 130.

Next, a function of the flow blocking unit 170 in the light scanning apparatus 100 will be described.

During an operation of the light scanning apparatus 100, the polygonal mirror 141 of the light deflector 140 rotates at a very high speed. For example, the polygonal mirror 141 of the light deflector 140 rotates at a speed equal to or above 30,000 rpm, where the high speed revolution generates noises. To increase printing speed of an image forming apparatus employing the light scanning apparatus 100, it is demanded to increase rotating speed of the polygonal mirror 141, and thus noises may further increase. Such noises may be transmitted out of the housing 110 via oscillation of the air. Although the housing 110 is sealed by the cover 190, gaps may be formed due to tolerances or looseness during assembly of the light scanning apparatus 100, and noises may be emitted via such gaps. As described above, the light source module 120 is attached to the outer surface of the first sidewall 111 of the housing 110, where a gap may be formed at the portion of the first sidewall 111 of the housing 110 for attaching the light source module 120 due to tolerances or looseness. Therefore, the portion of the first sidewall 111 of the housing 110 for attaching the light source module 120 may be one of paths in which noises are emitted. As shown in FIG. 4, the flow blocking unit 170 is located between the light source module 120 and the light deflector 140 and blocks an air flow toward the light source module 120 from among air flows formed as the light deflector 140 is driven, thereby suppressing noises generated by the light deflector 140 from being emitted out of the light scanning apparatus 100 via the portion of the first sidewall 111 of the housing 110 for attaching the light source module 120. Furthermore, as described above, since the synchronization detecting sensor 161 is also attached to the outer surface of the first sidewall 111 of the housing 110, the flow blocking unit 170 may extend to the space between the synchronization detecting sensor 161 and the light deflector 140, thereby suppressing noises from being emitted out of the light scanning apparatus 100 via the portion of the first sidewall 111 of the housing 110 for attaching the synchronization detecting sensor 161. As a result, noises generated by the light deflector 140 may be reduced more efficiently.

Figure 5:
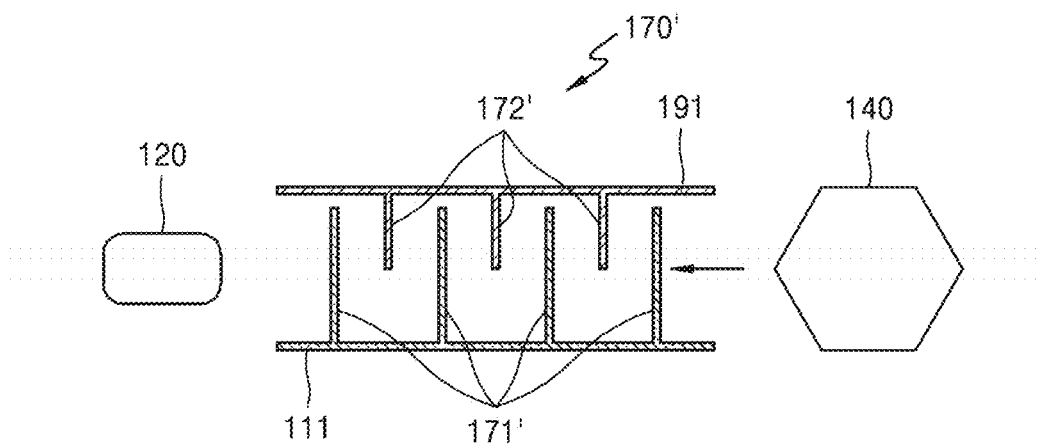
FIG. 5 is a diagram showing a structure of a flow blocking unit' according to another exemplary embodiment.

Although the present embodiment is described in relation to a case in which the second flow blocking partitioning wall 172 of the flow blocking unit 170 arranged on the bottom surface 191 of the cover 190 is located between the two first flow blocking partitioning walls 171 arranged on the first sidewall 111 of the housing 110, the inventive concept is not limited thereto. FIG. 5 is a diagram showing a structure of a flow blocking unit 170' according to another exemplary embodiment. As shown in FIG. 5, a plurality of first flow blocking partitioning walls 171' may be arranged on the first sidewall 111 of the housing 110, a plurality of second flow blocking partitioning walls 172' may be arranged on the bottom surface 191 of the cover 190, and the plurality of first flow blocking partitioning walls 171' and the plurality of second flow blocking partitioning walls 172' may be alternately arranged. As another example of the flow blocking unit 170, both the first flow blocking partitioning walls 171 and the second flow blocking partitioning wall 172 may be arranged on the bottom surface 115 of the housing 110 or the bottom surface 191 of the cover 190. As another example of the flow blocking unit 170, one first flow blocking partitioning wall 171 and one second flow blocking partitioning wall 172 may be arranged. As another example of the flow blocking unit 170, either the first flow blocking partitioning wall 171 or the second flow blocking partitioning wall 172 may be arranged.

Referring back to FIG. 1, the dust trapping unit 180 for trapping dusts that flow as the light deflector 140 is driven may be arranged inside the housing 110. The dust trapping unit 180 is another example of flow restriction units for restricting an air flow formed as the light deflector 140 is driven.

Figure 6:
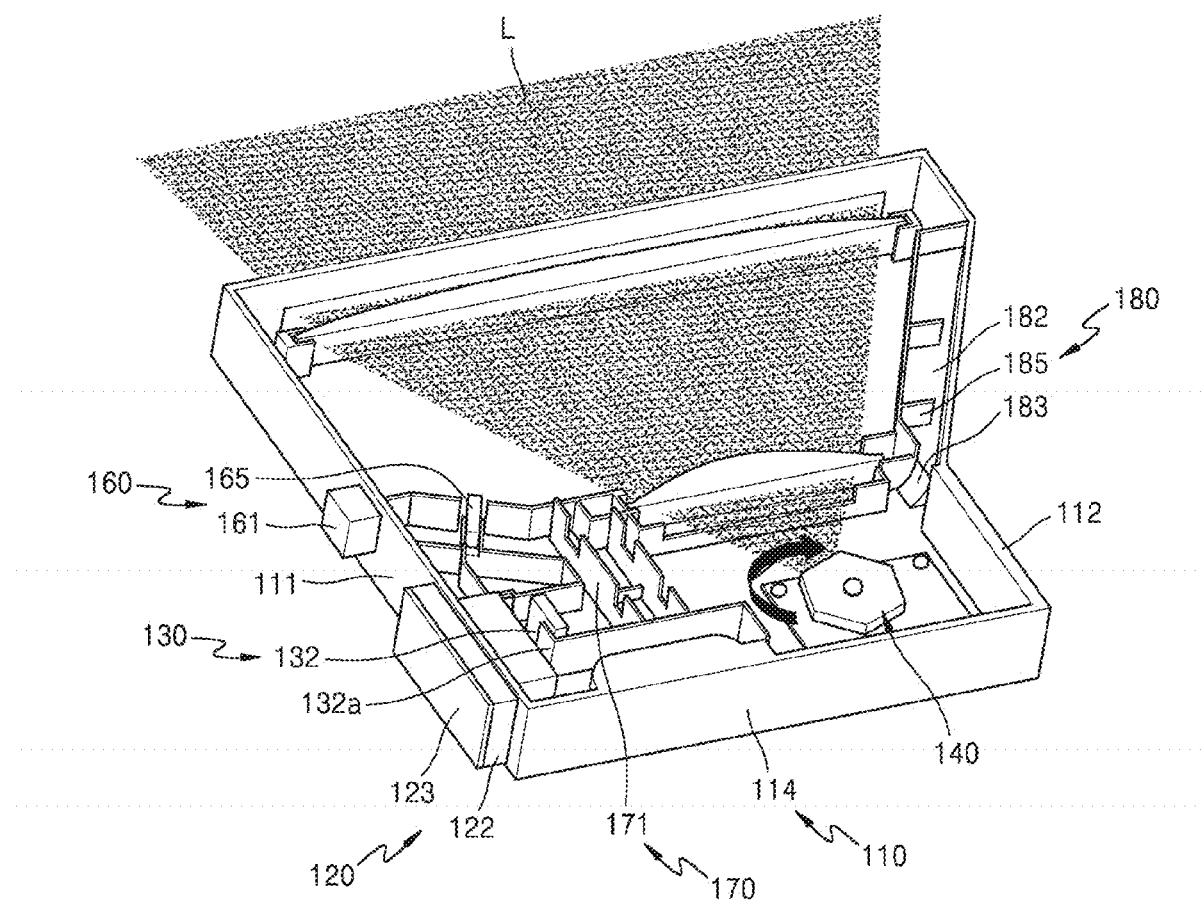
FIG. 6 is a diagram showing the dust trapping unit of the light scanning apparatus according to the present embodiment.

FIG. 6 is a diagram showing the dust trapping unit 180 of the light scanning apparatus 100 according to the present embodiment. Referring to FIGS. 1, 2, and 6, the dust trapping unit 180 may include a flow guide 181 and a dust storage unit 182.

The flow guide 181 is located between the light deflector 140 and the image forming optical system 150. The flow guide 181 blocks the air emitted as the light deflector 140 is driven and guides air flow in a direction (that is, a direction toward the dust storage unit 182). As shown in FIG. 2, the flow guide 181 may be a combination of a straight guiding plate 181a extending between the light deflector 140 and the image forming optical system 150 and a curved guiding plate 181b partially surrounding the light deflector 140. According to the present embodiment, the curved guiding plate 181b has a shape partially surrounding the light deflector 140, the inventive concept is not limited thereto. According to another embodiment, the curved guiding plate 181b may be formed to completely surround the light deflector 140. According to another embodiment, the flow guide 181 may include either the straight guiding plate 181a or the curved guiding plate 181b only. Here, the straight guiding plate 181a and the curved guiding plate 181b are formed at a low height to not to block the light beam L deflected and scanned by the light deflector 140.

The flow guide 181 may be arranged at the cover 190. As described above, the cover 190 may be a molded structure formed of a plastic resin, the flow guide 181 may protrude downward from the bottom surface 191 of the cover 190 and integrated thereto. The integrated structure of the flow guide 181 is simple in terms of a mechanical mold structure and may be easily formed without significant modifications of configuration of the cover 190 in the related art. According to another embodiment, the flow guide 181 may be separately fabricated and attached to the cover 190. Incidentally, although the present embodiment is described in relation to a case where the flow guide 181 is arranged only on the bottom surface 191 of the cover 190, the inventive concept is not limited thereto. According to another embodiment, the flow guide 181 may be arranged on the bottom surface 115 of the housing 110. According to another embodiment, the flow guide 181 may be arranged at both of the cover 190 and the housing 110.

The dust storage unit 182 is a space for trapping dusts formed as the light deflector 140 is driven. The dust storage unit 182 may be arranged in consideration of a rotating direction of the polygonal mirror 141 of the light deflector 140. In other words, the dust storage unit 182 is located between the light deflector 140 and the image forming optical system 150 at the downstream side of the rotating direction of the polygonal mirror 141. As shown in FIG. 6, if the polygonal mirror 141 rotates in the clockwise direction, an air flow in the space between the light deflector 140 and the image forming optical system 150 (refer to F of FIG. 9) is formed to flow away from the light source module 120. The downstream side of the rotating direction of the polygonal mirror 141 between the light deflector 140 and the image forming optical system 150 is a side nearby the second sidewall 112. Therefore, an inlet 183 of the dust storage unit 182 may be located at a corner between the flow guide 181 and the second sidewall 112 of the housing 110, and the dust storage unit 182 may be arranged in the space between the image forming optical system 150 and the second sidewall 112. According to another embodiment, if the polygonal mirror 141 rotates in the counterclockwise direction, an air flow in the space between the light deflector 140 and the image forming optical system 150 is formed to flow toward the light source module 120, and thus the dust storage unit 182 may be arranged in the space between the image forming optical system 150 and the first sidewall 111.

The inlet 183 of the dust storage unit 182 may be formed to have a relatively small width as compared to the space inside the dust storage unit 182.

Figure 7:
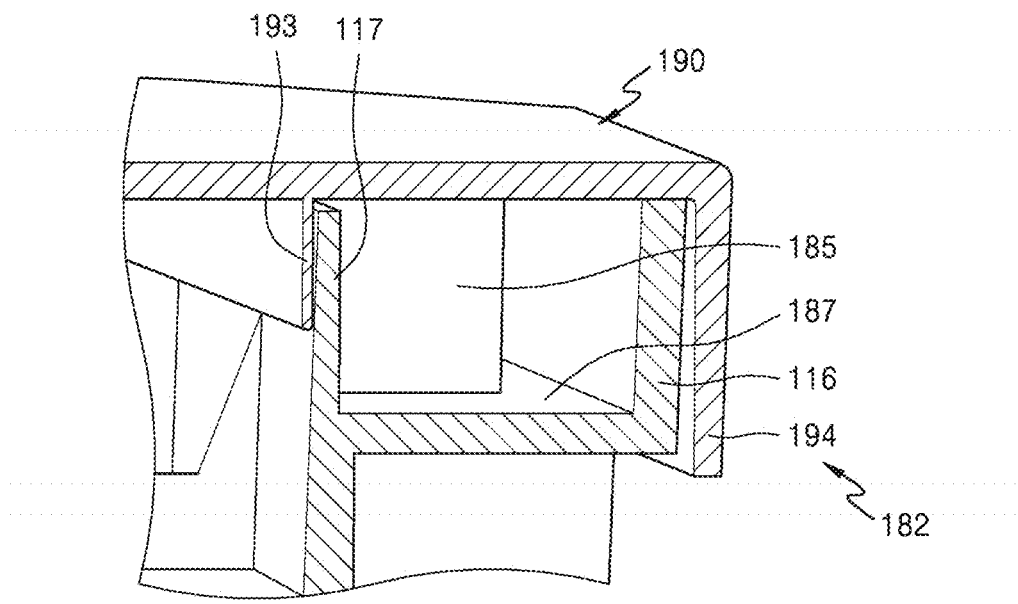
FIG. 7 is a schematic diagram showing a cross-section of the dust storage unit.
Figure 8:
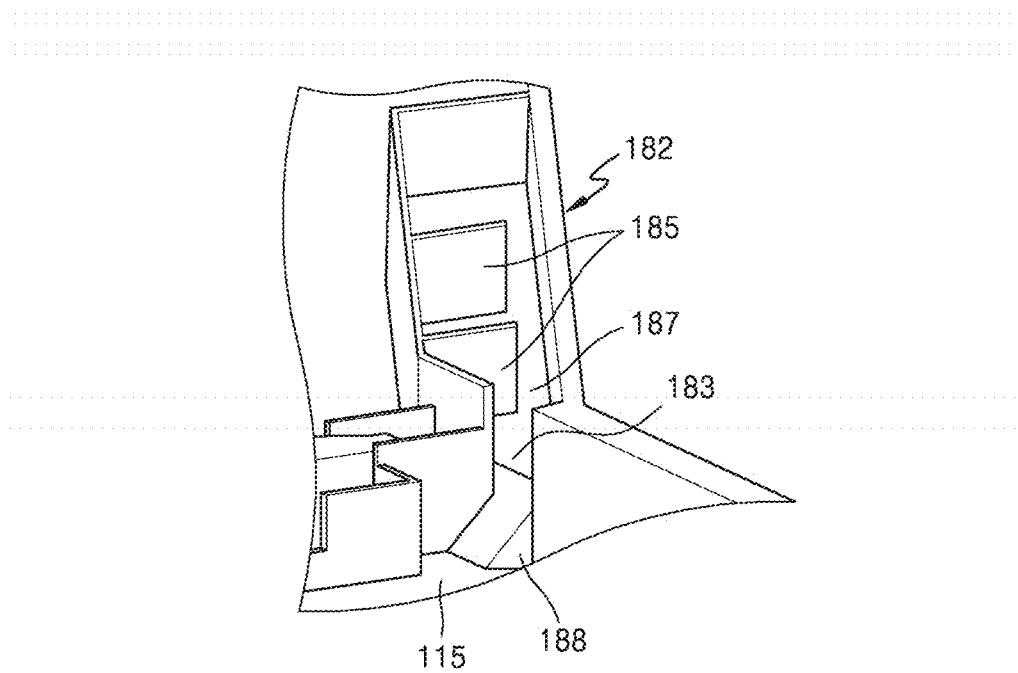
FIG. 8 is a schematic sectional view of the inlet of the dust storage unit.

FIG. 7 is a schematic diagram showing a cross-section of the dust storage unit 182, and FIG. 8 is a schematic sectional view of the inlet 183 of the dust storage unit 182. Referring to FIGS. 7 and 8, the dust storage unit 182 may be a space between the partitioning walls 116 and 117 arranged at the housing 110. The partitioning walls 116 and 117 arranged at the housing 110 may be interlocked with the partitioning walls 193 and 194 arranged at the cover 190, and thus the space other than the inlet 183 may be sealed. The outer partitioning wall 116 of the dust storage unit 182 may be considered as a part of the second sidewall 112. The partitioning walls 116 and 117 arranged at the housing 110 and the partitioning walls 193 and 194 arranged at the cover 190 may be integrated with the housing 110 and the cover 190, respectively. The integrated structures of the partitioning walls 116, 117, 193, and 194 of the dust storage unit 182 are simple in terms of a mechanical mold structure and may be easily formed without significant modifications of configurations of the housing 110 and the cover 190 in the related art To suppress dusts introduced into the dust storage unit 182 from escaping out of the dust storage unit 182, the dust storage unit 182 may include two inner partitioning walls 185. The two inner partitioning walls 185 may protrude from the partitioning wall 117 arranged at the housing 110 to a location nearby the center of the space inside the dust storage unit 182. Alternatively, the two inner partitioning walls 185 may protrude from the partitioning wall 116 arranged at the housing 110 to a location nearby the center of the space inside the dust storage unit 182. End portions of the two inner partitioning walls 185 and the outer partitioning wall 116 are apart from each other to form a path 186, such that the air may flow in the space inside the dust storage unit 182 defined by the two inner partitioning walls 185.

Incidentally, a bottom surface 187 of the dust storage unit 182 and the bottom surface 115 of the housing 110 having installed thereon the light deflector 140 may be formed to be at different heights. Therefore, a sloped portion 188 having a gradually sloped bottom surface may be formed at the inlet 183 of the dust storage unit 182 to not to interfere an air flow. The sloped portion 188 may be separately arranged and attached to the housing 110. According to another embodiment, the sloped portion 188 may be integrated with the housing 110. According to another embodiment, the bottom surface 187 of the dust storage unit 182 may be sloped nearby the inlet 183. In this case, the sloped structure of the bottom surface 187 of the dust storage unit 182 may be considered as the sloped portion 188. According to another embodiment, the bottom surface 187 of the dust storage unit 182 may be formed to be at a same height as the bottom surface 115 of the housing 110.

Next, a function of the dust trapping unit 180 in the housing 110 according to the present embodiment will be described.

Figure 9:
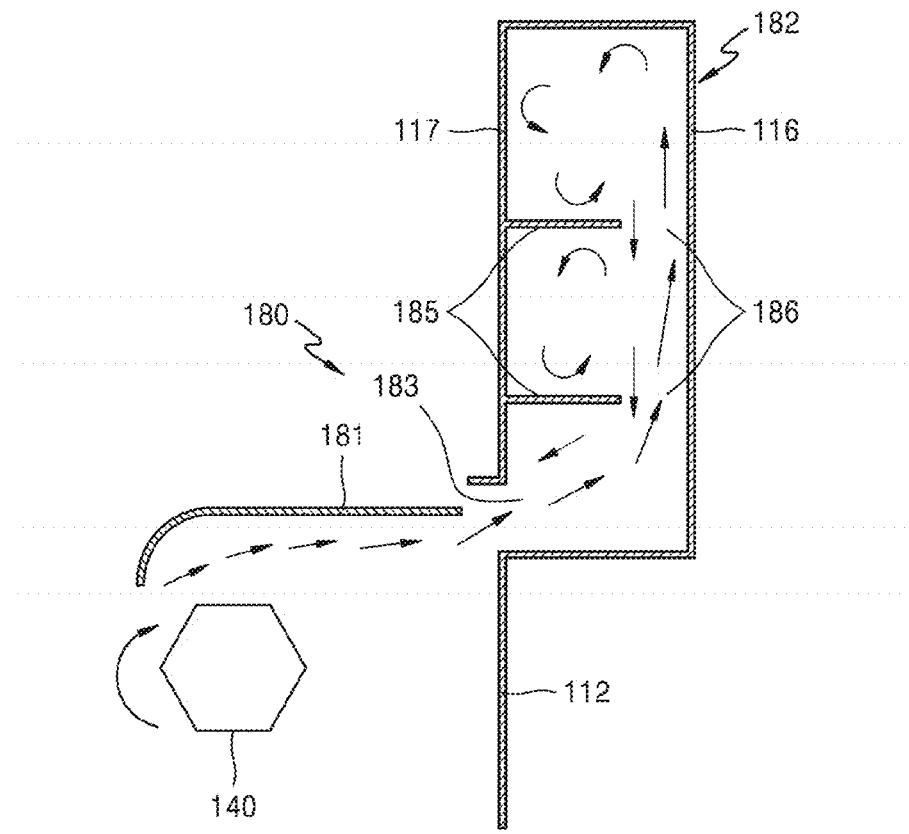
FIG. 9 is a diagram showing a path in which dusts flow as the light deflector is driven.

FIG. 9 is a diagram showing a path in which dusts flow as the light deflector 140 is driven. Referring to FIG. 9, as the polygonal mirror 141 of the light deflector 140 rotates at a high speed, dust flows are formed inside the housing 110, and thus dusts inside the housing 110 are scattered. The scattered dusts are guided by the flow guide 181, move toward the inlet 183 of the dust storage unit 182 located at a corner, and are collected at the dust storage unit 182. Since the inlet 183 of the dust storage unit 182 is formed to have a relatively small width as compared to the space inside the dust storage unit 182, the dusts are collected inside the dust storage unit 182, and thus contamination inside the housing 110 may be suppressed. Furthermore, the inner partitioning walls 185 arranged at the dust storage unit 182 suppresses dusts introduced into the dust storage unit 182 from escaping out of the dust storage unit 182, thereby improving dust trapping efficiency of the dust storage unit 182.

As described above, although the housing 110 is sealed by the cover 190, gaps may be formed due to tolerances or looseness during assembly of the light scanning apparatus 100, and foreign substances, that is, dusts may be introduced from outside of the light scanning apparatus 100 via the gaps. Furthermore, dusts inside the housing 110 may not only be dusts introduced from outside, but also dusts remaining from assembly of the housing 110 or dusts or contaminants formed due to mechanical abrasion inside the light scanning apparatus 100. It is necessary to prevent optical parts inside the light scanning apparatus 100 from being contaminated by the dusts to maintain high speed and long life expectancy of the light scanning apparatus 100. The dust trapping unit 180 according to the present embodiment traps dusts inside the light scanning apparatus 100 at the dust storage unit 182, thereby preventing optical parts inside the light scanning apparatus 100 from being contaminated. Therefore, high speed and long life expectancy of the light scanning apparatus 100 may be embodied.

Figure 10:
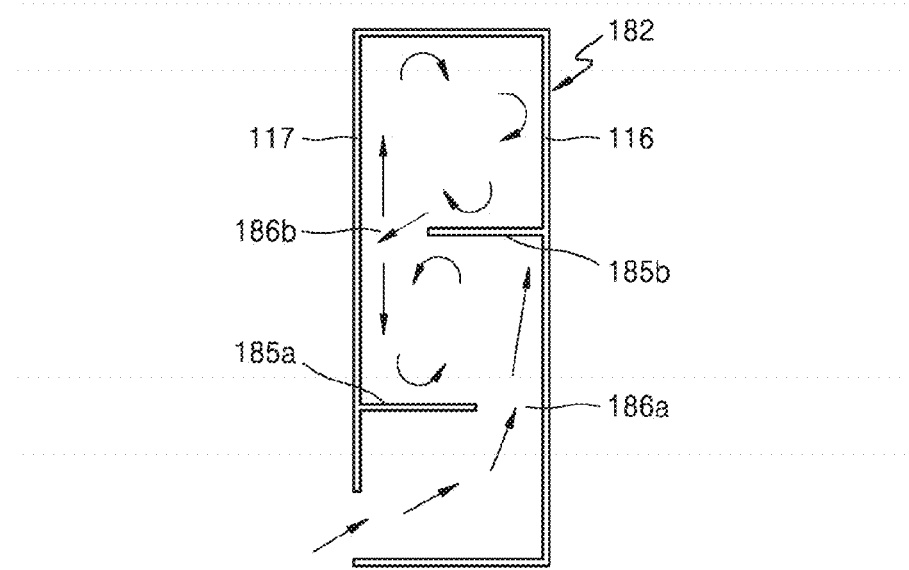
FIG. 10 is a diagram showing a structure of a dust storage unit' according to another embodiment.

Although the present embodiment is described in relation to a case in which the two inner partitioning walls 185 are formed at the partitioning wall 117, the inventive concept is not limited thereto. FIG. 10 is a diagram showing a structure of a dust storage unit 182' according to another embodiment. As shown in FIG. 10, a first inner partitioning wall 185a arranged at the partitioning wall 117 and a second inner partitioning wall 185b arranged at the other partitioning wall 116 may be alternately formed. As the inner partitioning walls 185a and 185b are alternately arranged, paths 186a and 186b formed by the inner partitioning walls 185a and 185b are formed to have a zigzag-like shape. Therefore, it may be more difficult for dusts introduced into the dust storage unit 182' to escape out of the dust storage unit 182', and thus dust trapping efficiency of the dust storage unit 182' may be improved. According to other embodiments, the inner partitioning walls 185 may be omitted, only one inner partitioning wall 185 may be arranged, or three or more inner partitioning walls 185 may be arranged.

Figure 11:
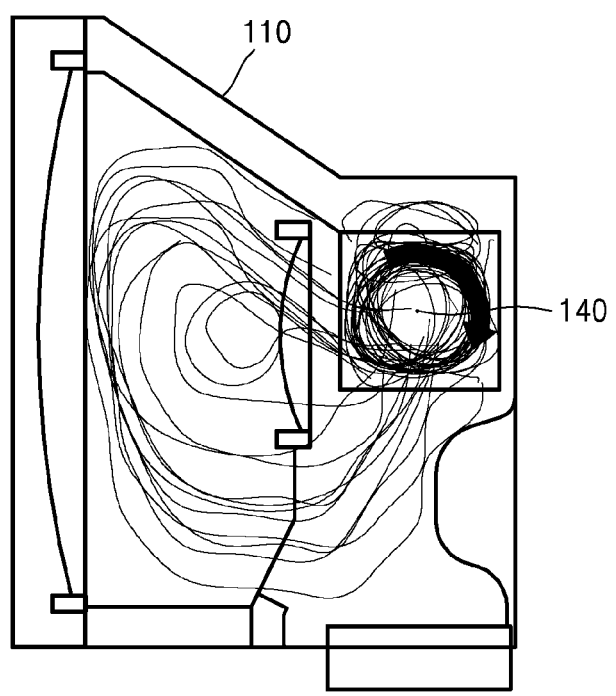
FIG. 11 is a diagram showing a result of computer simulation of flow distributions when a light deflector is driven in a light scanning apparatus according to a comparative embodiment.
Figure 12:
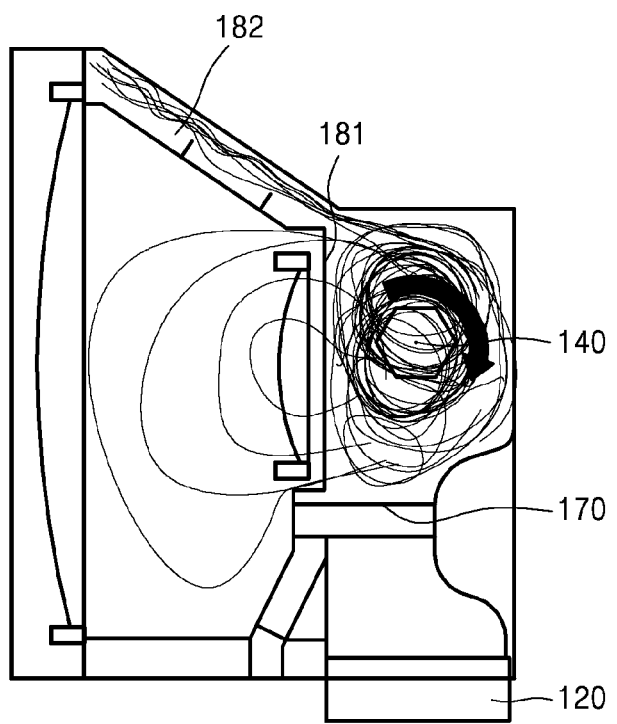
FIG. 12 is a diagram showing distribution of flows in the light scanning apparatus of FIG. 1 when the light deflector is driven.

FIG. 11 is a diagram showing a result of computer simulation of flow distributions when a light deflector is driven in a light scanning apparatus according to a comparative embodiment, and FIG. 12 is a diagram showing a result of computer simulation of flow distributions when the light deflector 140 is driven in the light scanning apparatus 100 according to the present embodiment.

Referring to FIG. 11, in the light scanning apparatus according to the comparative embodiment, air flows spread throughout the interior of the housing 110 as the light deflector 140 is driven. If air flows spread throughout the interior of the housing 110, noises generated by the light deflector 140 are likely be emitted to outside. Furthermore, optical parts (e.g., lenses of an incidence optical system, lenses of an image forming optical system, and lenses and sensors of synchronization detecting unit) may be contaminated by dusts scattering therein.

On the contrary, referring to FIG. 12, in the light scanning apparatus 100 according to the present embodiment, air flows nearby the light deflector 140 inside the housing 110 are restricted by the flow blocking unit 170 and the flow guide 181 nearby the light source module 120, where some air flow move toward the dust storage unit 182. As described above, since air flows based on operation of the light deflector 140 are restricted, noises emitted to outside may be reduced. Furthermore, since scattering dusts are trapped by the dust storage unit 182, internal contamination of the light scanning apparatus 100 may be suppressed.

Figure 13:
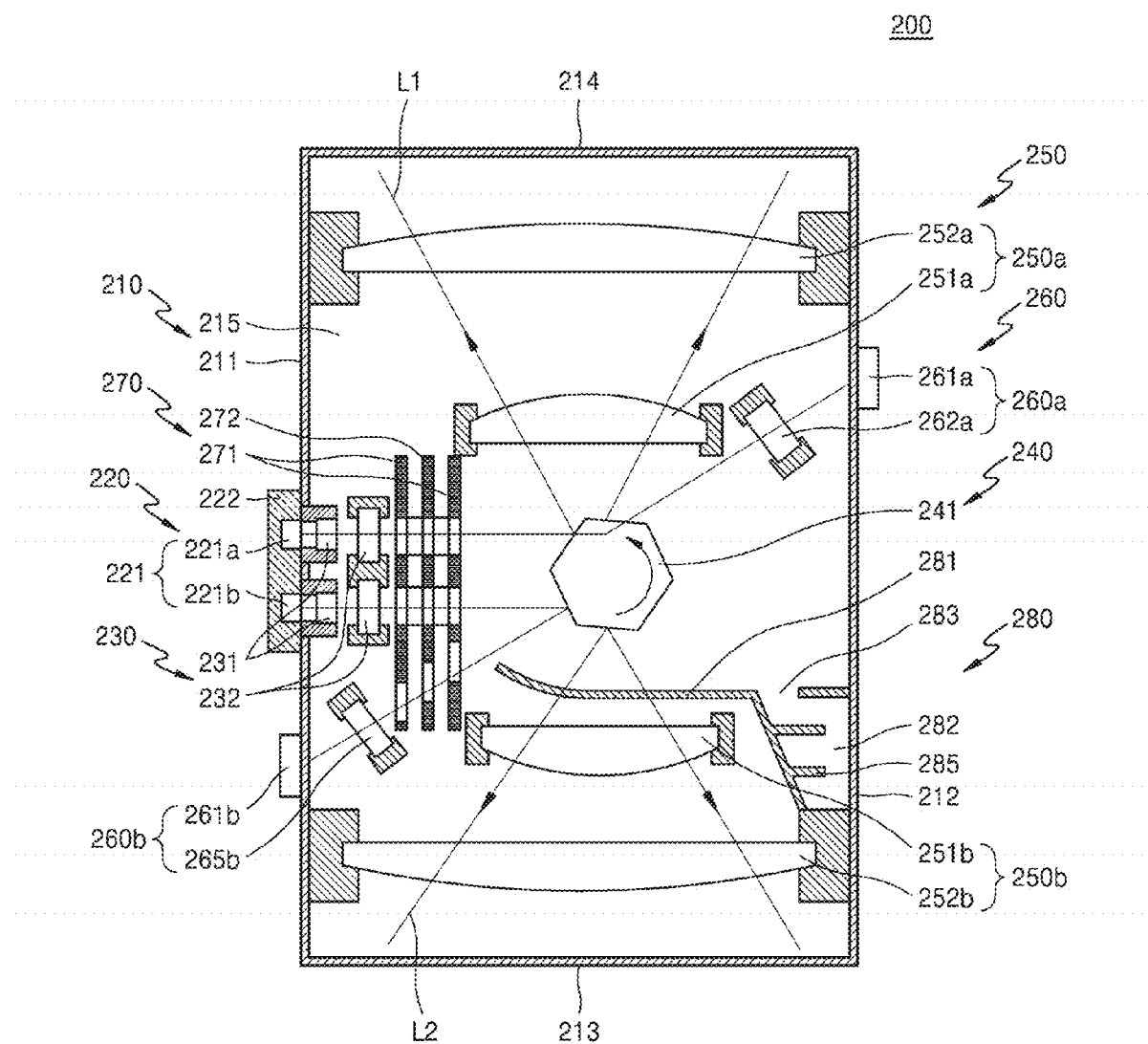
FIG. 13 is a schematic diagram showing a light scanning apparatus according to another exemplary embodiment.

FIG. 13 is a schematic diagram showing a light scanning apparatus 200 according to another exemplary embodiment. Referring to FIG. 13, the light scanning apparatus 200 according to the present embodiment includes a housing 210 and a cover (not shown) that covers the housing 210. The housing 210 may include first to fourth sidewalls 211, 212, 213, and 214 and a bottom surface 215 surrounded by the first to fourth sidewalls 211, 212, 213, and 214. Various optical parts (e.g., an incidence optical system 230, a light deflector 240, an image forming optical system 250, and a synchronization detecting unit 260) of the light scanning apparatus 200 are installed on the bottom surface 215 of the housing 210. Furthermore, a light source module 220 is mounted on a first sidewall 211 of the housing 210. Furthermore, a flow blocking unit 270 or a dust trapping unit 280 is arranged in the space inside the housing 210. The space inside the housing 210 is sealed by the cover.

The light source module 220 may include first and second light sources 221a and 221b, a light source holder 222 for fixing the first and second light sources 221a and 221b, and a circuit board (not shown) for driving the first and second light sources 221a and 221b. Laser diodes may be employed as the first and second light sources 221a and 221b.

The light deflector 240 is installed on the bottom surface 215 of the space inside the housing 210. The light deflector 240 may be a rotating polygonal mirror 241. In another example, the light deflector 240 may be a double-sided mirror manufactured via MEMS. First and second light beams L1 and L2 emitted by the first and second light sources 221a and 221b of the light source module 120 are incident to different reflective surfaces and are scanned in opposite directions with respect to the light deflector 240 as the light deflector 240 is driven.

The incidence optical system 230 may be arranged on light paths of the first and second light beams L1 and L2 between the light source module 220 and the light deflector 240. The incidence optical system 230 may include a light flux restricting element (not shown), a collimator lens 231, and a cylindrical lens 232 or may include at least some of the above-stated elements.

The image forming optical system 250 may be arranged on light paths of the first and second light beams L1 and L2 reflected by the light deflector 240. Since the first and second light beams L1 and L2 are scanned in directions away from the light deflector 240 as the light deflector 240 is driven, the image forming optical system 250 includes a first image forming optical system 250a located at a side to which the first light beam L1 is scanned and a second image forming optical system 250b located at a side to which the second light beam L2 is scanned. The first and second image forming optical systems 250a and 250b may include first scanning lenses 251a and 252a and first scanning lenses 251b and 252b, respectively. Numbers of scanning lenses constituting the first and second image forming optical systems 250a and 250b may vary according to optical designs and does not limit the present embodiment. For example, each of the first and second image forming optical systems 250a and 250b may include one scanning lens. In FIG. 13, the first and second light beams L1 and L2 travel toward the third and fourth sidewalls 213 and 214 of the housing 210, respectively. However, by arranging a reflective mirror (not shown) in the image forming optical system 250, light paths may be changed to directions perpendicular to the bottom surface 215 of the housing 210, and thus the first and second light beams L1 and L2 may be emitted out of the housing 210. In this case, according to locations of the reflective mirror, arrangement of lenses of the image forming optical system 250 may be changed.

The synchronization detecting unit 260 for detecting synchronization signals of the first and second light beams L1 and L2 deflected and scanned by the light deflector 240 may be arranged. The synchronization detecting unit 260 may include a first synchronization detecting unit 260a for detecting a synchronization signal of the first light beam L1 and a second synchronization detecting unit 260b for detecting a synchronization signal of the second light beam L2. The first and second image forming optical systems 250a and 250b may include first and second synchronization detecting sensors 261a and 261b and first and second synchronization detecting lenses 265a and 265b. When the polygonal mirror 241 of the light deflector 240 rotates in the counterclockwise direction, starting ends of the first and second light beams L1 and L2 are located at diagonal directions from the light deflector 240, and thus the first synchronization detecting unit 260a and the second synchronization detecting unit 260b may be arranged at diagonal directions from the light deflector 240. As shown in FIG. 13, starting end of a scan line of the first light beam L1 scanned by the light deflector 240 is located at a location far from the light source module 220, that is, a location nearby the second sidewall 212, and thus the first synchronization detecting sensor 261a may be arranged nearby the second sidewall 212. Incidentally, since starting end of a scan line of the second light beam L2 scanned by the light deflector 240 is located at a location nearby the light source module 220, that is, a location nearby the first sidewall 211, and thus the second synchronization detecting sensor 261b may be arranged nearby the first sidewall 211. According to another embodiment, by arranging a reflective mirror (not shown) in the first and second synchronization detecting units 260a and 260b, locations of the first and second synchronization detecting units 260a and 260b may be changed. For example, a light path of the first light beam L1 may be changed by arranging a reflective mirror in the first synchronization detecting unit 260a, thereby locating the first synchronization detecting sensor 261a nearby the first sidewall 211.

The flow blocking unit 270 is arranged in the space inside the housing 210. The flow blocking unit 270 is an example of flow restriction units for restricting an air flow formed as the light deflector 240 is driven. The flow blocking unit 270 may be located between the light source module 220 and the light deflector 240. The flow blocking unit 270 may include two first flow blocking partitioning walls 271 arranged at the housing 210 and a second flow blocking partitioning wall 272 arranged at the cover (not shown). The two first flow blocking partitioning walls 271 are arranged apart from each other, and the second flow blocking partitioning wall 272 is located between the two first flow blocking partitioning walls 271. According to another embodiment, the plurality of first flow blocking partitioning walls 271 and a plurality of second flow blocking partitioning walls 272 may be alternately arranged.

Since the first and second flow blocking partitioning walls 271 and 272 are located on a path of first and second light beams L1 and L2 that are emitted by the light source module 220 and travel toward the light deflector 240, portions of the first and second flow blocking partitioning walls 271 and 272 through which the first and second light beams L1 and L2 travel are opened.

As shown in FIG. 13, since the second synchronization detecting sensor 261b is located nearby the second sidewall 212, the flow blocking unit 270 may extend to the space between the light deflector 240 and the second synchronization detecting sensor 261b.

As described below, the first and second flow blocking partitioning walls 271 and 272 may not only suppresses noises as described below, but also reinforces structural strength of the housing 210.

The dust trapping unit 280 for trapping dusts that flow as the light deflector 240 is driven may be arranged inside the housing 210. The dust trapping unit 280 is another example of flow restriction units for restricting an air flow formed as the light deflector 240 is driven.

The dust trapping unit 280 may include a flow guide 281 and a dust storage unit 282.

The flow guide 281 may be located between the light deflector 240 and the second image forming optical system 250b. As shown in FIG. 13, the flow guide 281 may be a combination of a straight guiding plate extending between the light deflector 240 and the image forming optical system 250 and a curved guiding plate partially surrounding the light deflector 240. According to another embodiment, the flow guide 281 may include either the straight guiding plate or the curved guiding plate only. Here, the straight guiding plate and the curved guiding plate are formed at a low height to not to block the second light beam L2 deflected and scanned by the light deflector 240. The flow guide 281 may be arranged on the bottom surface of the cover. According to another embodiment, the flow guide 281 may be arranged on the bottom surface 215 of the housing 210 or may be arranged at both the cover and the housing 210.

The dust storage unit 282 may located between the light deflector 240 and the image forming optical system 250 at the downstream side of the rotating direction of the polygonal mirror 241. As shown in FIG. 13, if the polygonal mirror 241 rotates in the counterclockwise direction, an air flow in the space between the light deflector 240 and the second image forming optical system 250b is formed to flow away from the light source module 220. In other words, the downstream side of the rotating direction of the polygonal mirror 241 between the light deflector 240 and the second image forming optical system 250b is a side nearby the second sidewall 212. Therefore, an inlet 283 of the dust storage unit 282 may be located between the flow guide 281 and the second sidewall 212 of the housing 210, and the dust storage unit 282 may be arranged in the space between the second image forming optical system 250b and the second sidewall 212.

The inlet 283 of the dust storage unit 282 may be formed to have a relatively small width as compared to the space inside the dust storage unit 282. To suppress dusts introduced into the dust storage unit 282 from escaping out of the dust storage unit 282, the dust storage unit 282 may include one or more inner partitioning walls 285. If there is a difference between height of the bottom surface of the dust storage unit 282 and height of the bottoms surface of the housing 210, a sloped portion (not shown) for smooth air flow may be arranged at the inlet 283 of the dust storage unit 282.

Although the present embodiment is described in relation to a case in which the flow guide 281 is located between the light deflector 240 and the second image forming optical system 250b, the inventive concept is not limited thereto. The flow guide 281 may also be additionally arranged between the light deflector 240 and the first image forming optical system 250a or between the light deflector 240 and the first sidewall 211.

Although the present embodiment is described in relation to a case in which the dust storage unit 282 is arranged in the space between the second image forming optical system 250b and the second sidewall 212, the inventive concept is not limited thereto. The dust storage unit 282 may also be arranged in the space between the first image forming optical system 250a and the first sidewall 211. In another example, if the polygonal mirror 241 rotates in the clockwise direction, the dust storage unit 282 may be arranged in the space between the second image forming optical system 250b and the first sidewall 211 or the space between the first image forming optical system 250a and the second sidewall 212.

Although the present embodiment is described in relation to a case in which the first and second light sources 221a and 221b are arranged together on the first sidewall 211 of the housing 210, the inventive concept is not limited thereto. According to another embodiment, the first and second light sources 221a and 221b may be respectively arranged on the first and second sidewalls 211 and 212 of the housing 210 to face each other. In this case, the flow blocking unit 270 may be arranged at the both sides of the light deflector 240 (that is, a side nearby the first sidewall 211 and a side nearby the second sidewall 212).

Furthermore, although the present embodiment is described in relation to a case in which the light source module 220 includes two light sources, that is, the first and second light sources 221a and 221b, the inventive concept is not limited thereto. According to another embodiment, the light source module 220 may include four light sources. In this case, the four light sources may be arranged in two rows and two columns on the first sidewall 211 of the housing 210, such that light beams emitted by the four light sources may be incident to different reflective surfaces two by two. Optical parts of the incidence optical system 230 and the image forming optical system 250 may be additionally arranged in correspondence to the four light sources. Even if the light source module 220 includes four light sources as described above, when viewed from above, the overall arrangement of optical parts may not be significantly changed, and thus the flow restricting unit including the flow blocking units 170 and 270 and the dust trapping units 180 and 280 described above with reference to FIG. 13 may be applied as-is.

Although the present embodiment is described in relation to a case in which the light scanning apparatuses (100 of FIG. 1 and 200 of FIG. 13) include all of the flow guides 181 and 281 and the dust trapping units 182 and 282 as the dust trapping units 180 and 280, the inventive concept is not limited thereto. According to another embodiment, the dust trapping units 180 and 280 may include either the flow guides 181 and 281 or the dust trapping units 182 and 282. If the dust trapping units 180 and 280 include the flow guides 181 and 281 only, it may be expected to suppress contamination due to scattering dusts by guiding air flows to prevent the scattering dusts from being piled on optical parts. Alternatively, if the dust trapping units 180 and 280 include the dust trapping units 182 and 282 only, some of flowing dusts move toward the dust trapping units 182 and 282 without the flow guides 181 and 281, and dusts introduced into the dust trapping units 182 and 282 are trapped at the dust trapping units 182 and 282. Therefore, it may be expected to suppress scattering dusts.

Although the present embodiment is described in relation to a case in which the light scanning apparatuses 100 and 200 include all of the flow blocking units 170 and 270 and the dust trapping units 180 and 280 as flow restricting units, the inventive concept is not limited thereto. According to another embodiment, the light scanning apparatuses 100 and 200 may employ either the flow blocking units 170 and 270 or the dust trapping units 180 and 280. If the light scanning apparatuses 100 and 200 employ the flow blocking units 170 and 270 only, noises generated by the light deflectors 140 and 240 may be suppressed from being emitted out of the light scanning apparatuses 100 and 200. Alternatively, if the light scanning apparatuses 100 and 200 employ the dust trapping units 180 and 280 only, scattering of dusts based on air flows generated by the light deflectors 140 and 240 and contaminations of optical parts due to the scattering of dusts may be suppressed.

Figure 14:
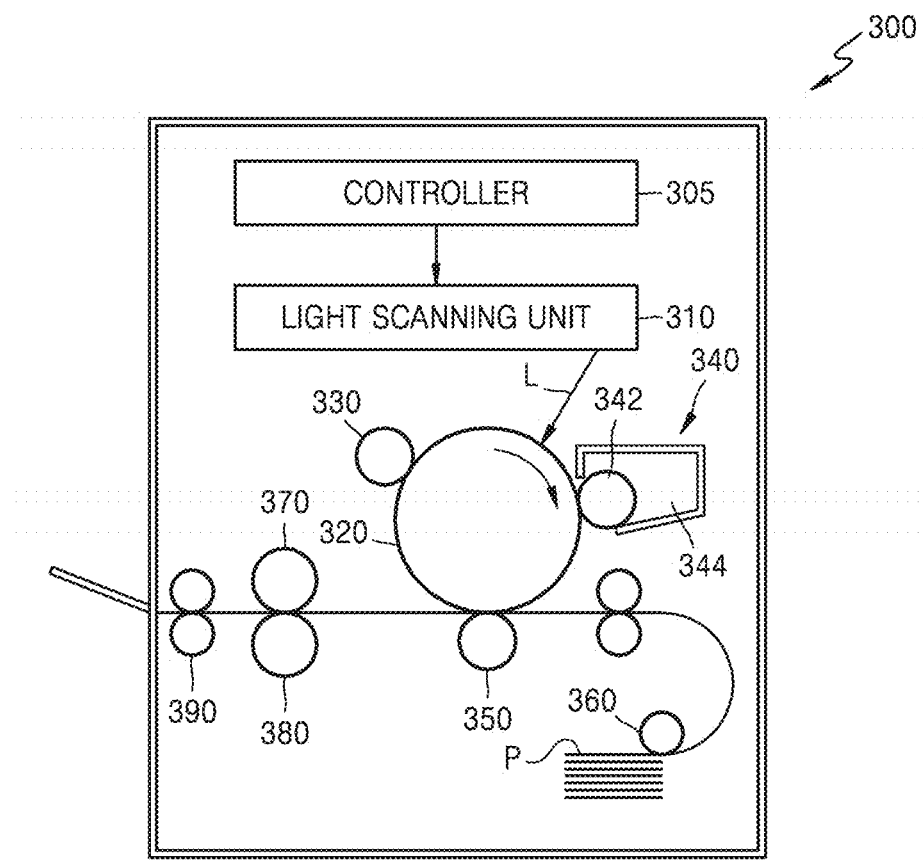
FIG. 14 is a diagram showing a result of computer simulation of flow distributions when the light deflector is driven in the light scanning apparatus according to the present embodiment.

FIG. 14 is a schematic diagram showing an electrophotography type image forming apparatus 300 according to an exemplary embodiment. The image forming apparatus 300 according to the present embodiment includes a light scanning unit 310, a photosensitive drum 320, and a developing unit 340.

The photosensitive drum 320 is an example of an image carrier and is a cylindrical metal pipe having a photosensitive layer formed to a certain width on the outer circumferential surface of the cylindrical metal pipe. Although not shown, a belt-type photosensitive belt may be employed as an image carrier. The outer circumferential surface of the photosensitive drum 320 becomes a surface to be scanned as stated in the above embodiments.

A charging roller 330 is arranged at the upstream side of a location on the outer circumferential surface of the photosensitive drum 320 exposed by the light scanning unit 310. The charging roller 330 is an example of charging unit for contacting the photosensitive drum 320, rotating on the surface of photosensitive drum 320, and charging the surface to a uniform potential. A charging bias is applied to the charging roller 330. A corona charger (not shown) may be employed instead of the charging roller 330.

The image forming apparatus 300 is controlled by a controller 305, and an electrostatic latent image is formed by scanning a light beam L that is modified based on image information onto the surface to be scanned of the photosensitive drum 320 charged to have a uniform potential. The image forming apparatus 300 may be identical to the light scanning apparatus (100 of FIG. 1) according to the previous embodiment.

The developing unit 340 includes a developing roller 342 and a toner accommodating unit 344. Toner accommodated in the toner accommodating unit 344 are attached to a surface of the developing roller 342 and are attached to the electrostatic latent image formed on the photosensitive drum 320 by a developing bias applied to the developing roller 342. In other words, the developing unit 340 supplies toner to the light scanning apparatus 310 and forms a toner image. Color of a toner image to be transferred to a printing medium is determined based on color of the supplied toner.

A transferring bias is applied to a transferring roller 350 located to face the light source module 220. A paper feeding roller 360 transfers a paper P, which is a printing medium, to a transferring nip at which the transferring roller 350 and the photosensitive drum 320 face each other. A toner image attached to the photosensitive drum 320 is transferred to the paper P by electrostatic attraction of the transferring bias applied to the transferring roller 350. The toner image transferred to the paper P receives heat and pressure from a fixing roller 370 and a pressing roller 380, and thus a printing operation is completed. The paper P is discharged by a discharging roller 390.

Although the electrophotography type image forming apparatus according to the present embodiment is described in relation to a case of forming a monochrome image, the inventive concept is not limited thereto. According to another embodiment, to print a color image, the light scanning apparatus 310, the photosensitive drum 320, and the developing unit 340 may be arranged for each of colors. The light scanning apparatus 310 arranged for each color may be identical to the light scanning apparatus 100 according to the previous embodiment. According to another embodiment, since the light scanning apparatus 200 described above with reference to FIG. 13 scans the first and second light beams L1 and L2, the single light scanning apparatus 200 may be shared by two photosensitive drums and two developing units. According to another embodiment, a light scanning apparatus may be configured to scan four light beams. In this case, the single light scanning apparatus may be shared by four photosensitive drums and four developing units.

A light scanning apparatus and an image forming apparatus including the same according to the above embodiments may reduce noises generated by high-speed revolution of a light deflector without an additional component.

A light scanning apparatus and an image forming apparatus including the same according to the above embodiments may prevent contamination of a light deflector without an additional component.

A light scanning apparatus and an image forming apparatus including the same according to the above embodiments may embody both high speed printing and long life expectancy.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A light scanning apparatus comprising:
a housing providing a space;
a light source module, installed on the housing, which emits a light beam;
a light deflector, installed on the housing and on which the light beam emitted by the light source module is incident, and which is driven to deflect the incident light beam;
an image forming optical system, installed in the space provided by the housing, which forms an image of the light beam deflected by the light deflector on a surface to be scanned;
at least one flow blocking partitioning wall arranged between the light source module and the light deflector in the space provided by the housing and traversing a vertical plane in which the light beam emitted by the light source module travels to be incident on the light deflector, the at least one flow blocking partitioning wall having an opening or a transparent member through which the light beam emitted by the light source module passes to be incident on the light deflector, so that the at least one flow blocking partitioning wall thereby restricts air flows occurred as the light deflector is driven; and a cover which covers the housing.

2. The light scanning apparatus of claim 1, wherein
the at least one flow blocking partitioning wall comprises a first flow blocking partitioning wall arranged on the housing and a second flow blocking partitioning wall arranged on the cover, and
the first flow blocking partitioning wall and the second flow blocking partitioning wall are alternately arranged.

3. The light scanning apparatus of claim 2, wherein
the first flow blocking partitioning wall extends upward from the housing and is integrated thereto, and
the second flow blocking partitioning wall extends downward from the cover and is integrated thereto.

4. The light scanning apparatus of claim 1, wherein
the light source module is installed on a side of the housing, and
the at least one flow blocking partitioning wall blocks air flows toward the light source module from among air flows formed as the light deflector is driven.

5. The light scanning apparatus of claim 4, further comprising:
a synchronization detecting unit including a synchronization detecting sensor which detects a synchronization signal of a light beam scanned by the light deflector,
wherein the synchronization detecting sensor is installed on a side of the housing having installed thereon the light source module, and
the at least one flow blocking partitioning wall extends between the synchronization detecting sensor and the light deflector.

6. The light scanning apparatus of claim 4, further comprising:
an incidence optical system including at least one lens arranged between the light source module and the light deflector,
wherein a portion of the at least one flow blocking partitioning wall extends to a fixing unit that fixes the at least one lens of the incidence optical system.

7. The light scanning apparatus of claim 4, further comprising a dust trapping unit which suppresses contamination due to dust that flow as the light deflector is driven.

8. The light scanning apparatus of claim 7, wherein the dust trapping unit comprises a flow guide which guides air flows formed as the light deflector is driven.

9. The light scanning apparatus of claim 7, wherein the dust trapping unit comprises a dust storage unit which traps dust.

10. The light scanning apparatus of claim 1, wherein the at least one flow blocking partitioning wall has the transparent member.

11. The light scanning apparatus of claim 1, further comprising a dust trapping unit which suppresses contamination due to dust that flows as the light deflector is driven.

12. The light scanning apparatus of claim 11, wherein the dust trapping unit comprises a flow guide which guides air flows formed as the light deflector is driven.

13. The light scanning apparatus of claim 12, wherein at least a portion of the flow guide is located between the light deflector and the image forming optical system.

14. The light scanning apparatus of claim 12, wherein the flow guide comprises a curved guiding plate that surrounds at least a portion of the flow guide.

15. The light scanning apparatus of claim 12, wherein the flow guide is a straight guiding plate, a curved guiding plate, or a combination thereof.

16. The light scanning apparatus of claim 12, wherein the flow guide is arranged on at least one of the cover and the housing.

17. The light scanning apparatus of claim 16, wherein the flow guide is integrated with at least one of the cover and the housing.

18. The light scanning apparatus of claim 12, wherein the dust trapping unit further comprises a dust storage unit to trap dust.

19. The light scanning apparatus of claim 18, wherein an inlet of the dust storage unit is arranged nearby an end of the flow guide.

20. The light scanning apparatus of claim 11, wherein the dust trapping unit further comprises a dust storage unit which traps dust.

21. The light scanning apparatus of claim 20, wherein the dust storage unit is arranged at a side of the space provided by the housing in which the image forming optical system is installed.

22. The light scanning apparatus of claim 21, wherein
the light deflector comprises a rotating polygonal mirror, and
the dust storage unit is located at a downstream side of a rotating direction of the polygonal mirror between the polygonal mirror and the image forming optical system.

23. The light scanning apparatus of claim 20, further comprising:
a first partitioning wall protruding from a bottom surface of the housing; and
a second partitioning wall protruding from a bottom surface of the cover,
wherein the first partitioning wall and the second partitioning wall are interlocked with each other and thereby seal the dust storage unit except for an inlet of the dust storage unit.

24. The light scanning apparatus of claim 20, further comprising:
at least one inner partitioning wall arranged inside the dust storage unit.

25. The light scanning apparatus of claim 24, further comprising:
a plurality of partitioning walls defining the dust storage unit,
wherein the at least one inner partitioning wall includes a plurality of inner partitioning walls arranged in parallel to one of the plurality of partitioning walls defining the dust storage unit.

26. The light scanning apparatus of claim 24, further comprising:
a plurality of partitioning walls defining the dust storage unit and including at least first and second partitioning walls,
wherein the at least one inner partitioning wall includes a plurality of inner partitioning wall that are alternately arranged with at least one of the plurality of inner partitioning walls formed on the first partitioning wall and another of the plurality of inner partitioning wall formed on the second partitioning wall.

27. The light scanning apparatus of claim 20, wherein
a height of a bottom surface of the dust storage unit is different from a height of a bottom surface of the housing, and
a sloped portion to compensate the height difference is arranged at an inlet of the dust storage unit.

28. The light scanning apparatus of claim 1, wherein
the light source module comprises first and second light sources that emit first and second light beams,
the first and second light beams emitted by the light source module are incident to different reflective surfaces of the light deflector and are deflected and scanned in different directions, and
the image forming optical system forms images of the light beams scanned in different directions on the surface to be scanned.

29. The light scanning apparatus of claim 28, wherein
the first and second light sources are located on a same sidewall of the housing, and
the at least one flow blocking partitioning wall is located between the first and second light sources and the light deflector and blocks air flows formed as the light deflector is driven.

30. The light scanning apparatus of claim 28, wherein
the first and second light sources are located on sidewalls of the housing facing each other, and
the at least one flow blocking partitioning wall is located between the first light source and the light deflector and/or between the second light source and the light deflector, and blocks air flows formed as the light deflector is driven.

31. The light scanning apparatus of claim 28, further comprising a dust trapping unit to suppress contamination due to dust that flow as the light deflector is driven.

32. The light scanning apparatus of claim 31, wherein
the dust trapping unit comprises a flow guide to guide air flows formed as the light deflector is driven, and
at least a portion of the flow guide is located between the light deflector and the first image forming optical system and/or between the light deflector and the second image forming optical system.

33. The light scanning apparatus of claim 31, wherein
the dust trapping unit comprises a dust storage unit to trap dust, and
the dust storage unit is arranged at a side of the space provided by the housing in which the first image forming optical system is installed and/or at a side of the space provided in the housing in which the second image forming optical system is installed.

34. An image forming apparatus comprising:
an image carrier;
a light scanning apparatus which forms an electrostatic latent image by scanning a light beam onto a surface to be scanned of the image carrier, wherein the light scanning apparatus comprises:
a housing providing a space;
a light source module, installed on the housing, which emits a light beam;
a light deflector, installed on the housing and on which the light beam emitted by the light source module is incident, and which is driven to deflect the incident light beam;
an image forming optical system, installed in the space provided by the housing, which forms an image of the light beam deflected by the light deflector on the surface to be scanned of the image carrier;
a flow blocking partitioning wall arranged between the light source module and the light deflector in the space provided by the housing and traversing a vertical plane in which the light beam emitted by the light source module travels to be incident on the light deflector, the flow blocking partitioning wall having an opening or a transparent member through which the light beam emitted by the light source module passes to be incident on the light deflector, so that the flow blocking partitioning wall thereby restricts air flows occurred as the light deflector is driven; and
a cover which covers the housing; and
a developing unit which supplies a toner to develop the electrostatic latent image formed on the image carrier.

35. A light scanning apparatus comprising:
a light source which emits a light beam;
a light deflector on which the light beam emitted by the light source is incident, and which is driven to deflect the incident light beam;
an image forming optical system which forms an image of the light beam deflected by the light deflector on a surface to be scanned; and
a flow blocking partitioning wall arranged between the light source and the light deflector and traversing a vertical plane in which the light beam emitted by the light source travels to be incident on the light deflector, the flow blocking partitioning wall having an opening or a transparent member in a travel path of the light beam from the light source to the light deflector to allow the light beam emitted by the light source to pass therethrough and be incident on the light deflector,
the flow blocking partitioning wall thereby restricting air flows that are formed as the light deflector is driven and are directed toward the light source.

36. The light scanning apparatus of claim 35, further comprising:
a housing; and
a cover which covers the housing so that the housing and the cover together form an enclosure with a space inside the enclosure, wherein
the light deflector is inside the space,
the travel path travels through the space, and
the flow blocking partitioning wall is integrally formed with one of the housing and the cover and extends from the one of the housing and the cover into the space.

* * * * *